(12) United States Patent
Guim Bernat et al.

(10) Patent No.: US 10,095,622 B2
(45) Date of Patent: Oct. 9, 2018

(54) SYSTEM, METHOD, AND APPARATUSES FOR REMOTE MONITORING

(71) Applicants: Francesc Guim Bernat, Barcelona (ES); Karthik Kumar, Chandler, AZ (US); Robert G. Blankenship, Tacoma, WA (US); Raj K. Ramanujan, Federal Way, WA (US); Thomas Willhalm, Sandhausen (DE); Narayan Ranganathan, Portland, OR (US)

(72) Inventors: Francesc Guim Bernat, Barcelona (ES); Karthik Kumar, Chandler, AZ (US); Robert G. Blankenship, Tacoma, WA (US); Raj K. Ramanujan, Federal Way, WA (US); Thomas Willhalm, Sandhausen (DE); Narayan Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/983,081

(22) Filed: Dec. 29, 2015

(65) Prior Publication Data

US 2017/0185518 A1    Jun. 29, 2017

(51) Int. Cl.
*G06F 12/00* (2006.01)
*G06F 12/0831* (2016.01)
*G06F 12/084* (2016.01)
*G06F 13/16* (2006.01)
*G06F 12/0875* (2016.01)
*G06F 12/0817* (2016.01)
*G06F 12/0802* (2016.01)

(52) U.S. Cl.
CPC ........ *G06F 12/0833* (2013.01); *G06F 12/084* (2013.01); *G06F 12/0817* (2013.01); *G06F 12/0875* (2013.01); *G06F 13/1663* (2013.01); *G06F 12/0802* (2013.01); *G06F 2212/314* (2013.01); *G06F 2212/621* (2013.01); *G06F 2212/622* (2013.01)

(58) Field of Classification Search
None
See application file for complete search history.

(56) References Cited

U.S. PATENT DOCUMENTS

| 6,961,806 | B1  | 11/2005 | Agesen et al. |
| 7,310,709 | B1* | 12/2007 | Aingaran ............ G06F 11/1064 711/122 |
| 7,516,277 | B2  | 4/2009  | Kilian et al. |
| 7,613,882 | B1  | 11/2009 | Akkawi et al. |

(Continued)

OTHER PUBLICATIONS

International Search Report and Written Opinion for Application No. PCT/US2016/069064, dated Apr. 17, 2017, 12 pages.

(Continued)

*Primary Examiner* — Brian Peugh
(74) *Attorney, Agent, or Firm* — Nicholson De Vos Webster & Elliott LLP

(57) ABSTRACT

Embodiments of systems, method, and apparatuses for remote monitoring are described. In some embodiments, an apparatus includes at least one monitoring circuit to monitor for memory accesses to an address space; at least one a monitoring table to store an identifier of the address space; and a tag directory per core used by the core to track entities that have access to the address space.

12 Claims, 16 Drawing Sheets

(56) References Cited

U.S. PATENT DOCUMENTS

| | | | |
|---|---|---|---|
| 8,347,064 B1 | 1/2013 | Glasco et al. | |
| 8,838,430 B1 | 9/2014 | Lang et al. | |
| 9,208,091 B2* | 12/2015 | Blaner | G06F 12/0831 |
| 2008/0034355 A1 | 2/2008 | Shen et al. | |
| 2009/0157970 A1* | 6/2009 | Kornegay | G06F 12/084 |
| | | | 711/130 |
| 2010/0138607 A1* | 6/2010 | Hughes | G06F 12/0828 |
| | | | 711/121 |
| 2011/0087843 A1 | 4/2011 | Zhao et al. | |
| 2012/0117334 A1 | 5/2012 | Sheaffer et al. | |
| 2012/0151153 A1 | 6/2012 | Jantsch et al. | |
| 2013/0124805 A1 | 5/2013 | Rafacz et al. | |
| 2013/0243003 A1 | 9/2013 | Oda | |
| 2014/0281180 A1 | 9/2014 | Tune | |
| 2014/0379997 A1* | 12/2014 | Blaner | G06F 12/0831 |
| | | | 711/146 |
| 2016/0179674 A1* | 6/2016 | Sury | G06F 12/0833 |
| | | | 711/141 |
| 2017/0185517 A1 | 6/2017 | Guim Bernet et al. | |

OTHER PUBLICATIONS

Final Office Action from U.S. Appl. No. 14/983,052, dated Oct. 6, 2017, 13 pages.
International Search Report and Written Opinion for Application No. PCT/US2016/069063, dated May 30, 2017, 15 pages.
Non-Final Office Action from U.S. Appl. No. 14/983,052, dated Apr. 5, 2018, 17 pages.
Non-Final Office Action from U.S. Appl. No. 14/983,052, dated Apr. 6, 2017, 12 pages.

* cited by examiner

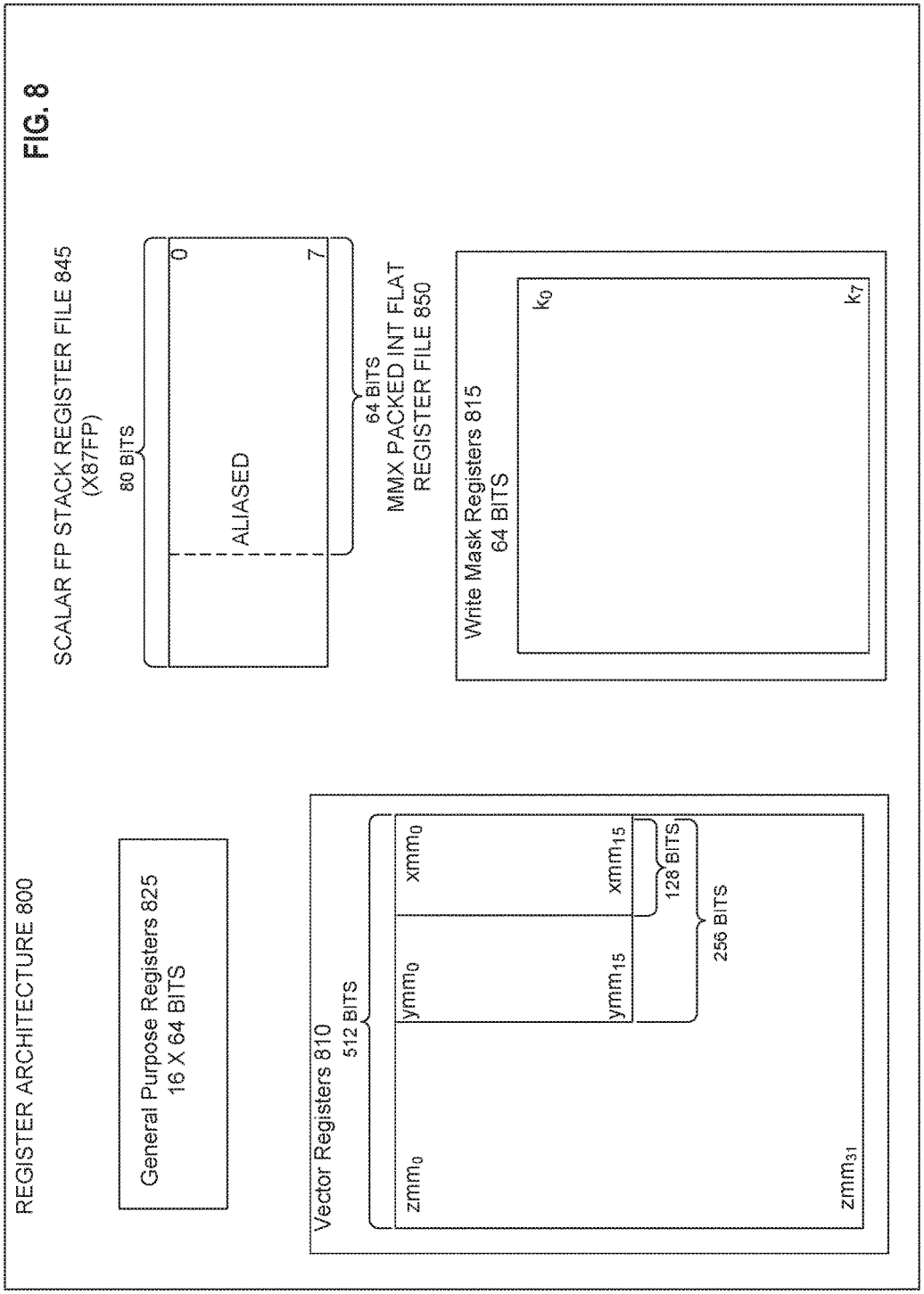

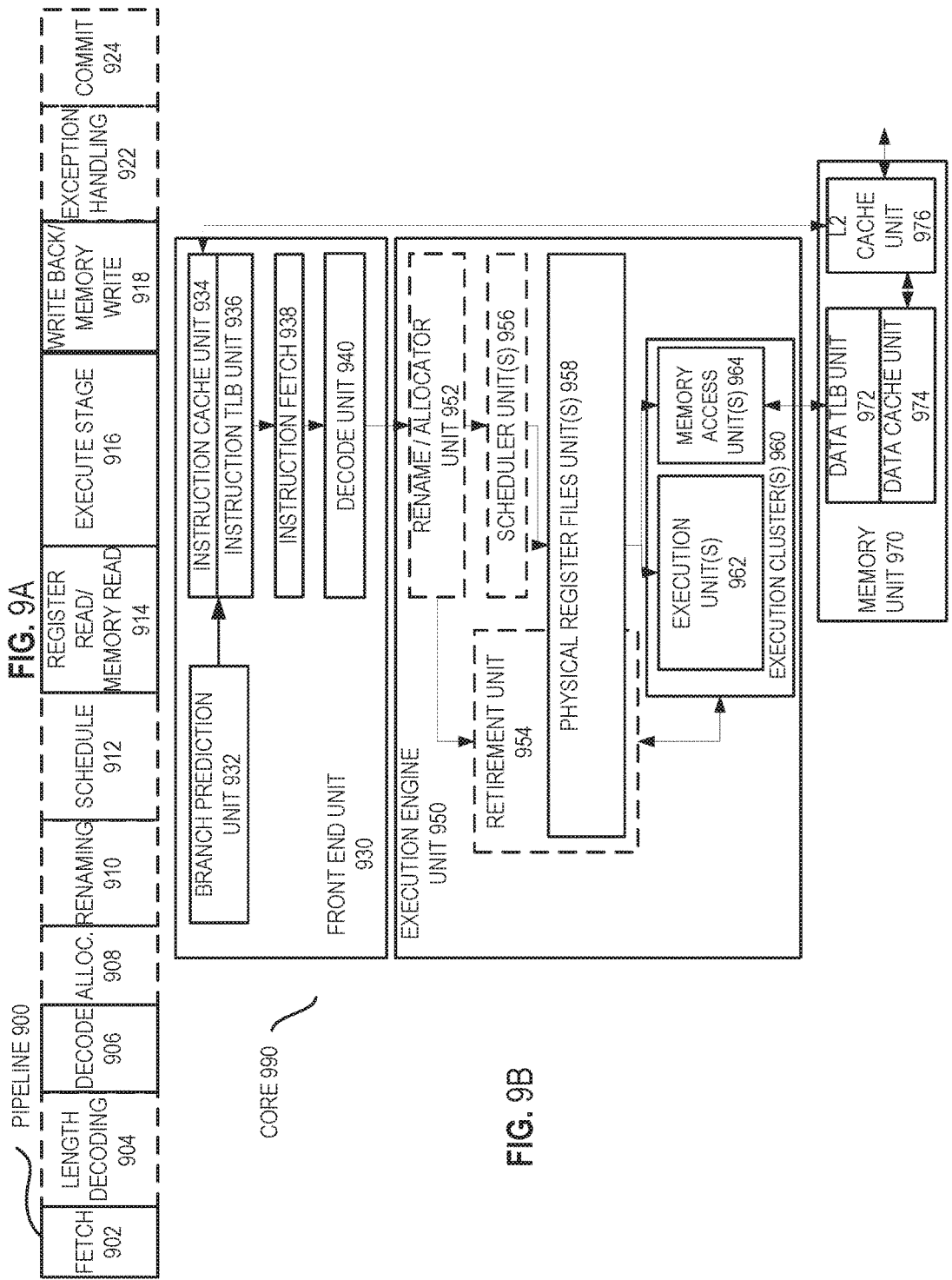

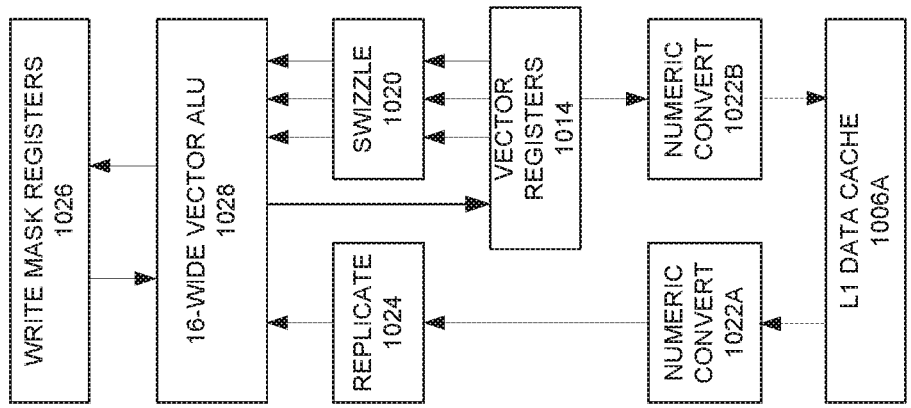
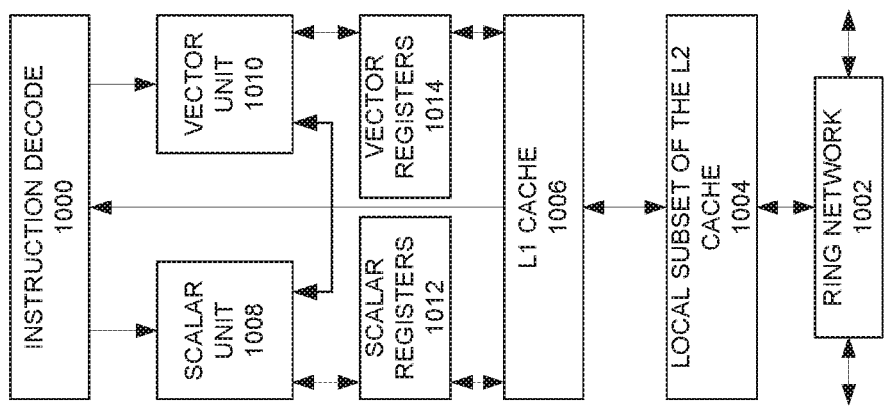

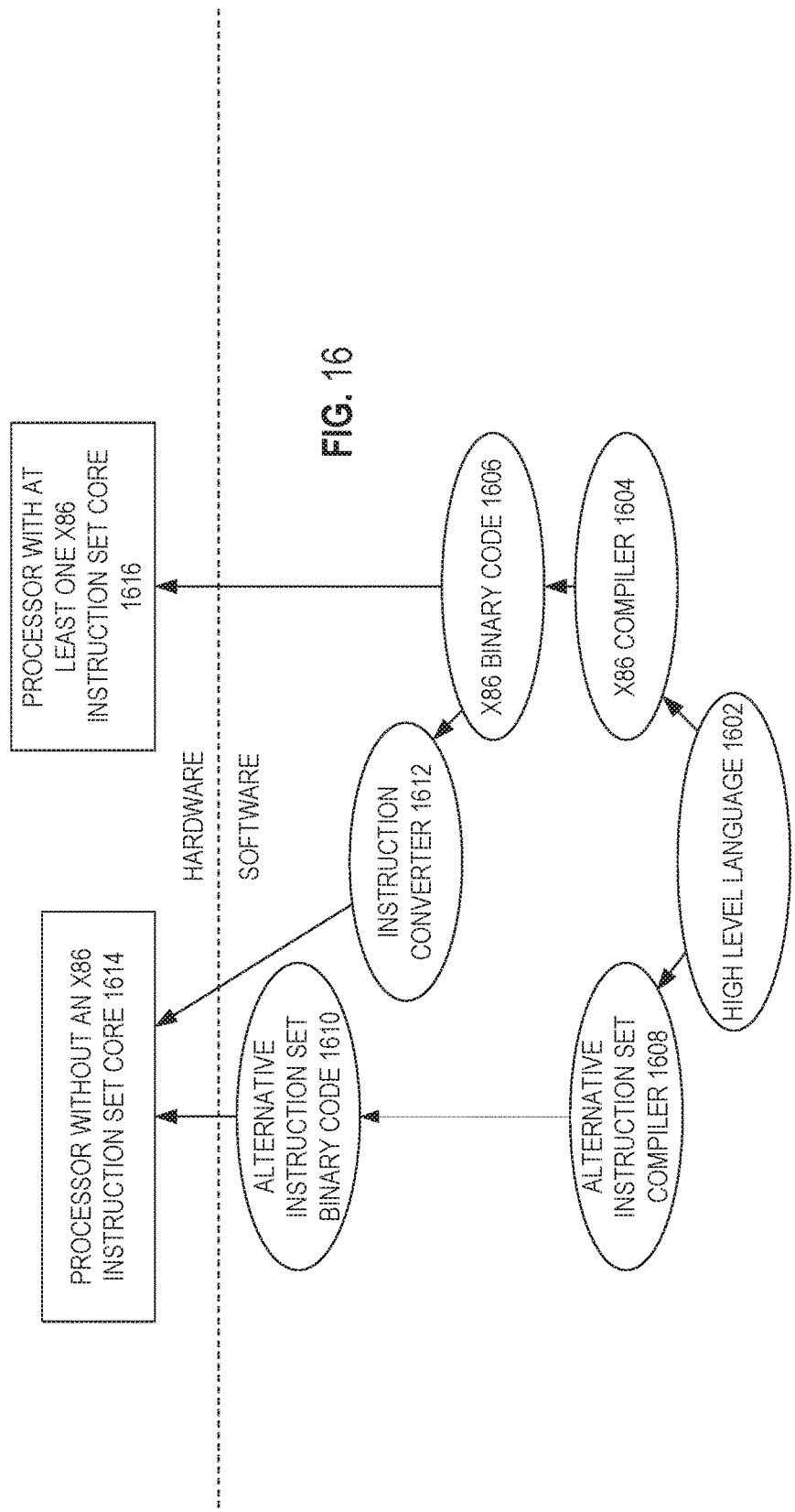

SYSTEM, METHOD, AND APPARATUSES FOR REMOTE MONITORING

FIELD OF INVENTION

The field of invention relates generally to computer processor architecture, and, more specifically, to remote monitoring.

BACKGROUND

With fabric latencies projected to reach within an order of memory latencies, a distributed shared memory (DSM) system can offer a large, single address space to a cluster of servers on a fabric; thus offering a scalable, cost-efficient alternative to "scale-up" node-controller systems. However, one of the drawbacks of DSM is the cache coherence problem for an application's memory references. For an enterprise or big data application, several types of memory references, such as the stack and temporary storage per process that is running on a system need not be coherent. On the other hand, there are often sections of code where the application needs to ensure coherence (for example: a critical section for transaction processing). Without the ability to offer some form of coherence, DSM usages over our fabrics are handicapped in their ability to handle transaction-based processing. This could be a serious limiting factor, given that the industry is trending towards unified systems for both analytics and transaction processing.

BRIEF DESCRIPTION OF THE DRAWINGS

The present invention is illustrated by way of example and not limitation in the figures of the accompanying drawings, in which like references indicate similar elements and in which:

FIG. 8 is a block diagram of a register architecture according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIGS. 10A-B illustrate a block diagram of a more specific exemplary in-order core architecture, which core would be one of several logic blocks (including other cores of the same type and/or different types) in a chip;

FIG. 16 is a block diagram contrasting the use of a software instruction converter to convert binary instructions in a source instruction set to binary instructions in a target instruction set according to embodiments of the invention.

DETAILED DESCRIPTION

Detailed below are embodiments of hardware to offer hooks to software, so that software can enforce a limited, use-case specific form of cache coherence in a distributed shared memory system that spans non-coherent domains. In particular, embodiments are discussed herein relating to an application programming interface (API), a distributed directory scheme, and a filter based directory that hardware uses to track remote references.

Figure 1:
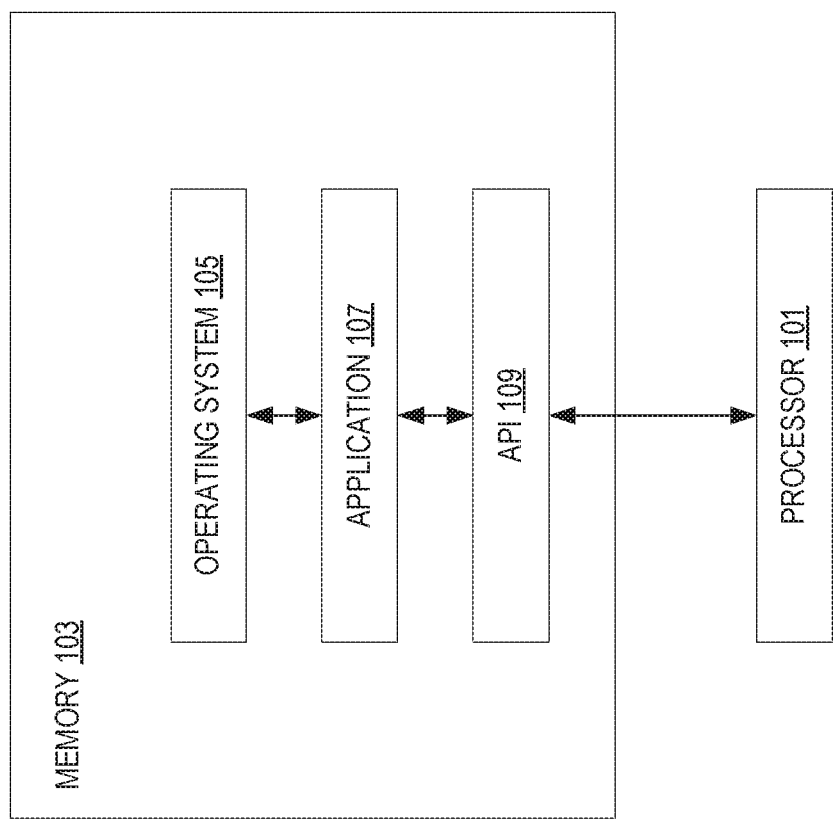
FIG. 1 illustrates an embodiment of a system using an API for cache coherence.

FIG. 1 illustrates an embodiment of a system using an API for cache coherence. A memory 103 is coupled to a processor 101 which executes instructions stored in the memory 103. Stored in memory 103 is an operating system 105, an application 107, and an API 109. The application calls the API 109 to mark a memory region to be "tracked" for references over a fabric or on die interconnect by remote nodes. This tracking may be done with a library call to mcoherent( ); which an application uses to mark a memory region for tracking. An exemplary of use of this API 109 is:

```
#include <fabriccoh.h>
/* mark a memory region for tracking with some specified hints */
int mcoherent(void *addr, unsigned long len, int track_size, list track_nodes, int snoop_hint);
/* reset memory region tracking */
int mreset (void *addr);
int msnoop (void *addr);
int minvalidate (void *addr);
int mupdate (void *addr);
```

The memory range is specified by *addr (address) and len (length, or the size of the address region). The application (via the API) also indicates a granularity at which the memory region is to be tracked, using the track_size variable. Exemplary sizes are TRACK_LINE (64 B), TRACK_PAGE (4 kB), TRACK_LARGE_PAGE (2M), or TRACK_HUGE_PAGE (1 G) which indicate the unit of monitoring to be a cache line, page, large page or huge page, respectively. This is useful because the application may have some knowledge of how the memory region is going to be used. For example, the application may expect that remote nodes may operate on and modify only isolated rows or the application may expect that a remote node may operate on and modify a larger set of rows with a bulk operation. Or an application may know that when a certain data structure is modified, it is always modified in its entirety. Depending on the usage, different sizes of tracking may be more efficient.

Based on what is specified for track_size, use of a distributed directory "remote" bit is appropriately modified (for example, the "remote" bit at the first cache line of the region is used as a proxy for the region). The application may also expect only a certain subset of nodes within the cluster to be within a coherent domain for a given data structure. For example, it may know that in a 32 node cluster, only nodes 3, 4, 5, 6 are running processes that may need to access the memory region. In this case, the application can tell hardware that only this specific list of nodes need to be tracked—and this is specified using the track_nodes argument to mcoherent( ). Typically, the default for track_nodes is all nodes.

An additional hint the application can provide is regarding how it expects to use coherence for tracking granularity. For example, if the application is only offering some notion of eventual consistency or probabilistically bound staleness guarantees, it may not need to snoop the modified region as aggressively/frequently (may be sufficient at some barriers) when compared to use of strong consistency. Since snoop traffic can flood a fabric or interconnect, hardware can use the hint from the application to tradeoff directory space vs. fabric/interconnect bandwidth. If snoops are likely to be less frequent, it may be sufficient to monitor "remote node groups." For example, a 32 node cluster, may have 4 node groups of 8 nodes each and two bits are sufficient to track these node groups. When the application wants to enforce coherence, since it is not known which node(s) within the group referenced/used the tracked memory, snoops are set to all the nodes within the group. This may be acceptable if coherence is enforced only at some barriers since snoops will be sent out less frequently. In the case of stronger consistency requirements, snoops may need to be sent out more frequently, and it may be required to target a precise node, and track at finer granularity. The expected frequency/aggressiveness for coherence is specified using the snoop hint variable, which may be set to FREQUENT, INFREQUENT, etc.

Additional flags may be used such as mode and flags variables to specify hints provided by the application about the specified memory range. For example, there may be a specific table that hosts transactions, amongst several other tables in a system and the application may want this table to be tracked for coherence.

Figure 2:
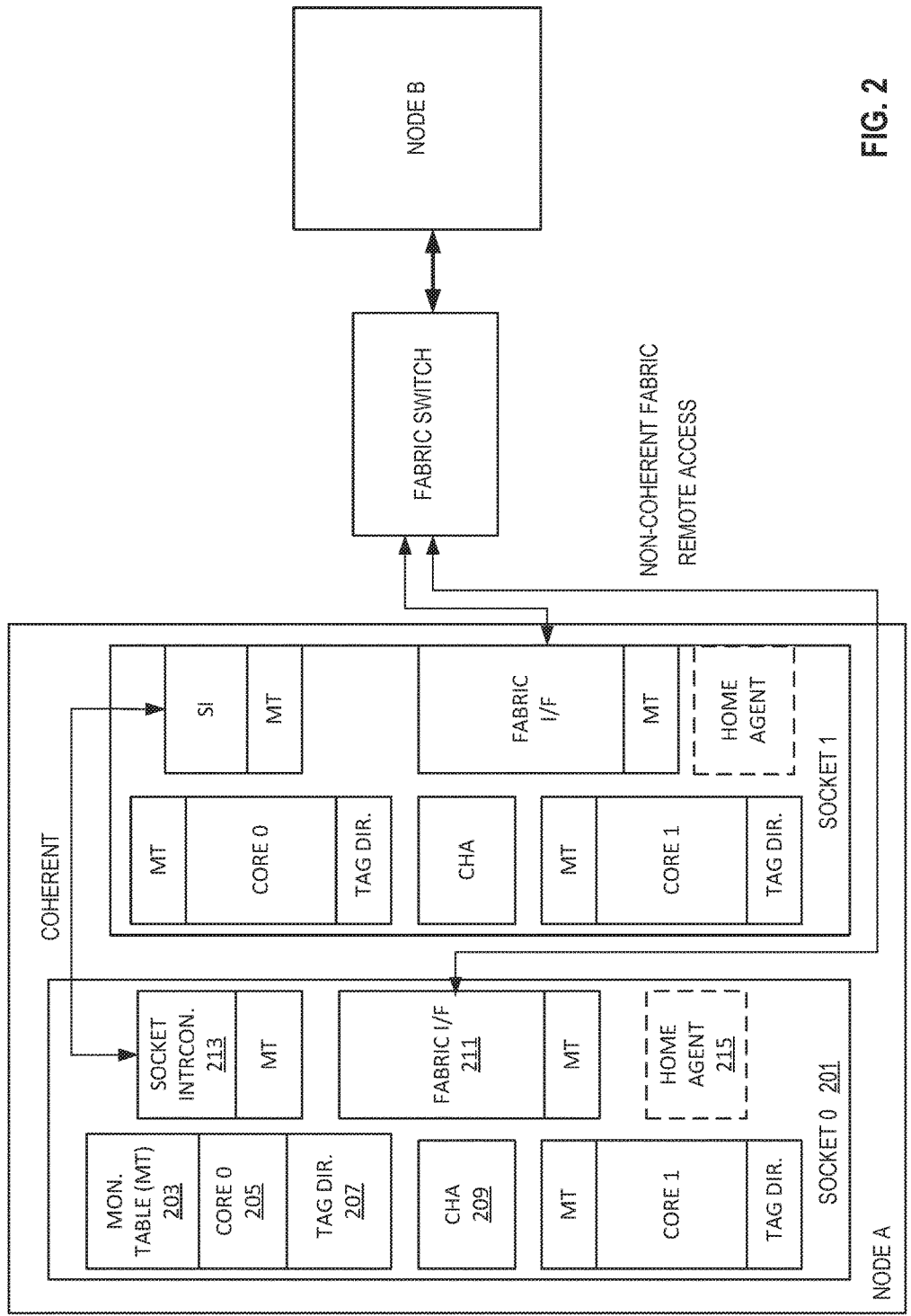
FIG. 2 illustrates an embodiment of a system that supports remote monitoring.

Embodiments of hardware to implement the aforementioned semantics that the API (mreset, msnoop, etc.) are detailed herein. FIG. 2 illustrates an embodiment of a system that supports remote monitoring. A typical socket 201 includes a plurality of processor cores 205, on die interconnect hardware 213, and a fabric interface 211. Remote monitoring may be from socket to socket within a node (through a coherent on die interconnect 213) or between nodes using a fabric switch and a fabric interface 211. As such, depending on the address space that monitor requests are targeting, requests may go to the same node's local memory, they may go the on die interconnect 213 to route the request to the other processors within the same coherent domain, or they may go to processors through a Host Fabric Interface (HFI) 211 that are outside the coherent domain. One system can be composed by one or more coherent domains being all the coherent domains connected through fabric interconnect. For example, high performance computing or data centers are composed by N clusters or servers that can communicate with each other using the fabric. Using the fabric, each coherent domain can expose some address regions to the other coherent domains. However, accesses between different coherent domains are not coherent. In most instances, the fabric allows for mapping address of memory ranges between different coherent domains.

Nodes also typically have caching agents and/or home agents 215. Caching agents are the coherency agents within a node that process memory requests from the cores within the same node. Home agents (HA) are the node clusters that are responsible of processing memory requests from the caching agents and act as a home for part of the memory address space (one die can have multiple Homes having a distributed address space mapping). In this illustration, there is a home agent 215 per socket, however, in some embodiments there is one home agent per node. Further, in some embodiments, the functionality of the home agent is included in the caching agent and called a caching home agent (CHA) as shown as 209. Throughout this description, CHA is typically used for ease in description.

A caching agent (such as CHA 209) is an entity which may initiate transactions into coherent memory, and which may retain copies in its own cache structure. The caching agent is defined by the messages it may sink and source according to the behaviors defined in the cache coherence protocol. A caching agent can also provide copies of the coherent memory contents to other caching agents. A home agent (such as CHA 209 or home agent 215) is an entity which services coherent transactions, including handshaking as necessary with caching agents. A home agent supervises a portion of the coherent memory. A home agent is responsible for managing the conflicts that might arise among the different caching agents. It provides the appropriate data and ownership responses as required by a given transaction's flow.

Further, the home agents include a distributed directory that has the following states for memory addresses: clean (this is the only copy, for example, lines that are just written back), any (any remote socket within the node may have a copy), and invalid (the local socket's cache has a copy). An additional state (remote) indicates that a remote node has requested a copy and may have and may be updated when a request for the line originates from the fabric.

One logical place to add a monitoring scheme is the home agents inside the node, and in some embodiments, that is the case. However, when distributed schemes map address spaces in the HA (node controller, hashing schemes, hemisphere, quadrant schemes, etc.), this may add too much complexity in terms of design, area and validation. As such, in some embodiments, this monitoring information is kept as a monitoring table (MT) 203: 1) in the proxies to the node, that tunnel any memory transaction coming from other nodes to the home node (fabric interface 211), 2) the cores inside the node 205, and 3) the unique agents that can access the local memory without going through the proxies (on die interconnect 213), to identify accesses. This table is used by a monitor circuit (not shown) which tracks memory/cache accesses, compares those accesses to the table, and alerts the originating core of any accesses as requested.

Each proxy and core can contain a fixed number of monitors, and each monitor contains the address range and original home requesting the monitor. If there are no free entries in the monitors, then that monitoring request fails. The request would also fail if the address range being requested overlaps with another monitoring entry. In a case of failure, a fail response would be sent back to the originator fabric and it would be communicated to the software stack. Eventually, the software would get notified in case of failure and it would need to take corresponding actions. A different way to propagate the failure to the software stack could be issuing a callback to the software stack from the core.

A distributed memory monitoring scheme allows the core executing the previously discussed API to register at the home nodes to monitor the address range of interest. The monitoring scheme allows for discovering when a given line that is accessed by other caching agents in the system falls within the specified address range; accordingly, it updates the sharer's valid bits for the given range. The core that requests the tracking for the address range uses a tag directory structure 207 to denote the sockets in the cluster that have access to the specific address range and is used by the core to track/monitor the address range.

This directory is a non-perfect tag directory in two dimensions. First, given that the whole system can have a very large address space, different addresses can match in the same tag entry (explained below). Second, each bit in the sharer's remote tracking information (e.g., bit mask or bloom filter) corresponds to a group of caching agents in the system. Filtering hardware associated with the tag directory per core performs Bloom or other filtering to test inclusion in a set.

Figure 3:
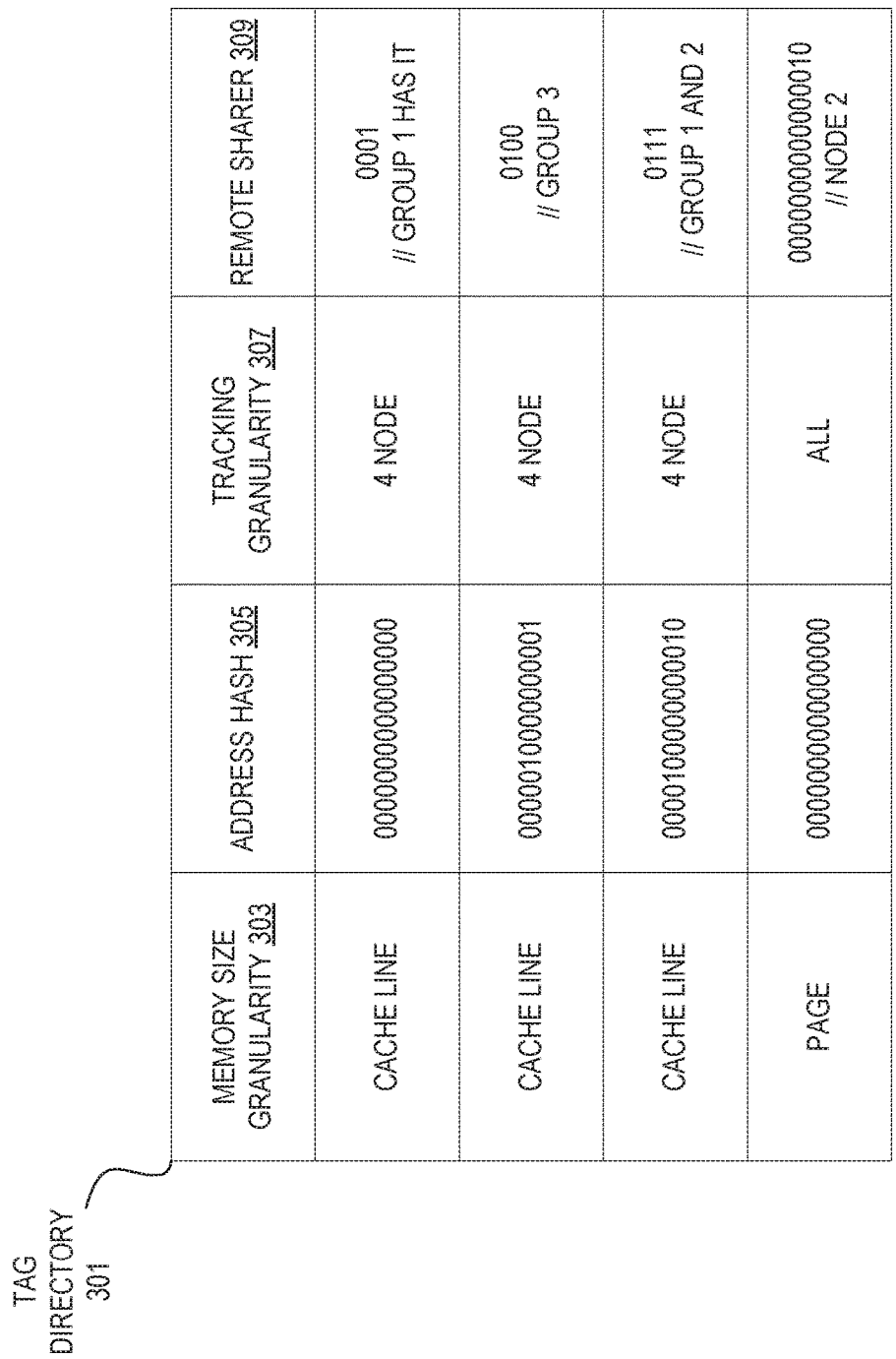
FIG. 3 illustrates an embodiment of the tag directory.

FIG. 3 illustrates an embodiment of the tag directory. An entry in the tag directory 301 includes fields for tracking size granularity 303, address hash 305, tracking granularity 307, and remote sharer information 309.

The tracking size 303 and tracking granularity 307 can be provided through a mcoherent call as detailed above. As such, the number of rows in the directory can be reduced using page-level or huge page level tracking instead of cache line tracking. The hints specified by the application using mcoherent( ) enable this to be done in some embodiments.

As a simplified example, assume a hypothetical cluster of 8 nodes, 2 sockets each and consider each node has only 4 MB of memory (65K lines of 64 B each). Now there are 65K row entries in the look-up-directory, each corresponding to a line in the node. In this scenario, the 16 bit bit-mask accurately tracks the sockets which have requested memory from this node. However, in reality, systems have much, much larger memory and the space requirements for the look-up-directory can quickly become impractical. For this reason, the directory non-perfect.

Bloom filtering, or node groups, or a subset of nodes 309 instead of the bit mask to reduce the space complexity for the directory.

In order to provide scalability, in some embodiments, cache line addresses 305 are hashed onto rows in the directory using a hash function H( ), note that number of rows is less than the number of cache lines. A good choice of H( ) can result in fewer collisions, for example, using lower-order bits of the cache line address ensures good distribution for the hashing function. Note that having collisions does not mean any loss of correctness; it merely indicates potential false positives: since two cache lines map onto the same row in the directory, we will end up snooping the union of the "remote nodes" for the two cache lines.

With the choice of a good hash function, and the use of the distributed directory bits (the tag directory need only be consulted if the distributed directory bit for the cache line says "remote") the probability of false positives becomes small. At the same time, the number of nodes requiring snoops is significantly reduced. As mentioned earlier, further tradeoffs are possible by varying the granularity of hashing, and using bloom filter tracking instead of a bit-mask based on hints specified by the application using the mcoherent( ) API call.

Software has the ability to reset the entries corresponding to a memory region in the look-up-directory based on usages with the mreset( ) API call, and this ensures the number of false positives of the directory does not monotonically increase over time (since a bloom filter based approach becomes less effective as the filter becomes fully populated—recall it only tells for sure if something is not present—and this reduces the search space). Further, at points when coherence needs to be enforced, software can consult the directory structure and explicitly issue remote snoop, write-back, or invalidate commands using the API.

Figure 4:
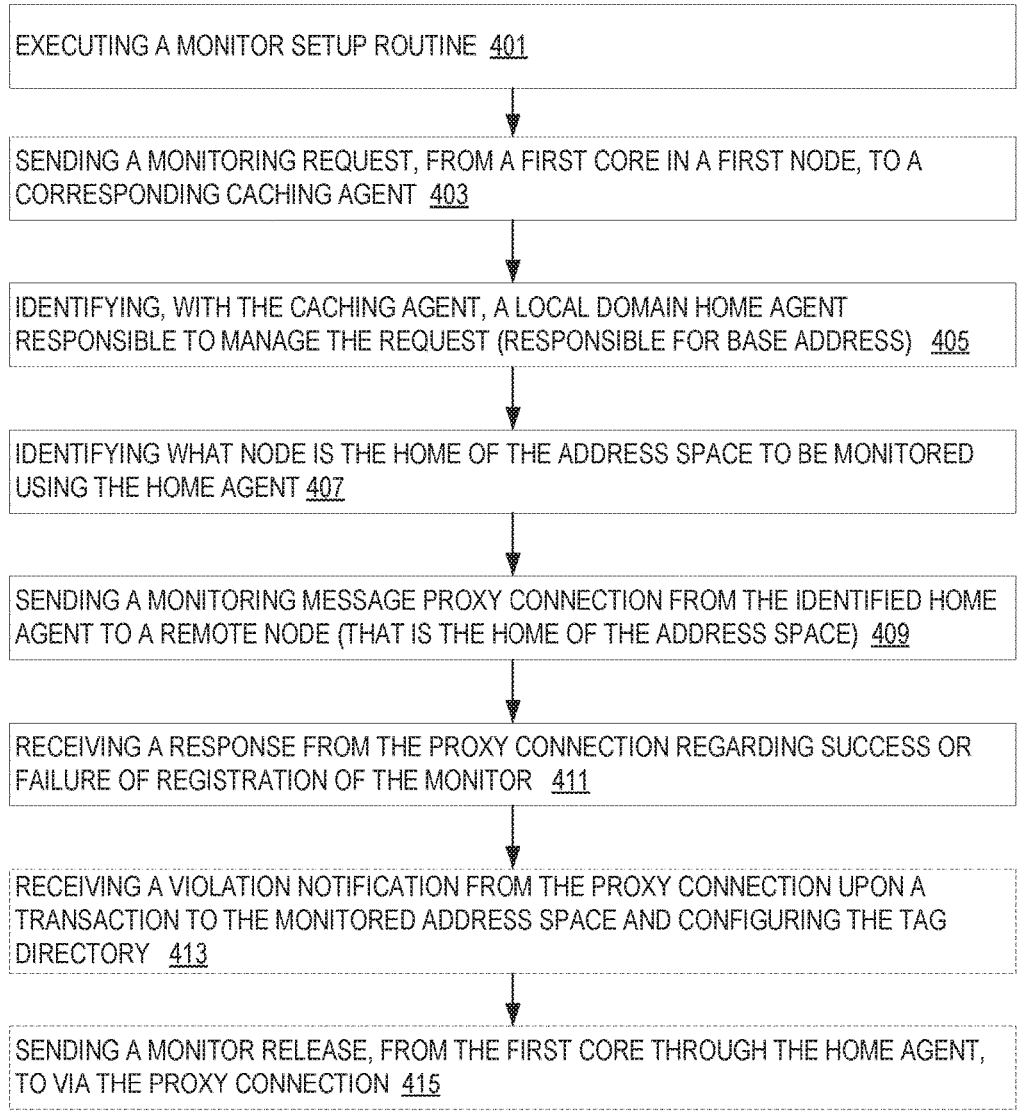
FIG. 4 illustrates an exemplary embodiment of the use of cache coherence through monitoring including registration.

FIG. 4 illustrates an exemplary embodiment of the use of cache coherence through monitoring including registration. At 401, a first core (originating core) in a first node, executes a monitor setup routine. For example, in FIG. 2, core 0 205 executes mcoherent.

This execution causes a monitoring request (monitor message) to be sent from the first core to its corresponding caching agent at 403. This request includes the information (base address, granularity, size, and mode) to configure the monitor. The caching agent manages the baseline address to setup the requested monitor. This caching agent is separate from the home agent depending upon the implementation. For example, in FIG. 2, the core 205 sends request to CHA 209 (combined caching and home agent). In other words, the core alerts the caching agent of the address (AS) that it wants monitored [base_address to base_address+granularity*size] and the type of monitoring (write/read).

At 405, in some embodiments, the caching agent identifies a local domain home agent responsible to manage the request. For example, the home agent responsible for the base address. Note that the identified home agent may be combined in the same entity (CHA) as the caching agent as detailed above.

The identified home agent identifies what node in the system is the home for the address space that the core (thread) wants to monitor (it can be the local coherent domain) at 407.

Once the home for the address region is identified, a request is sent to the proxy (in the illustration of FIG. 2 the fabric 211 or on die interconnect 213) to setup a monitor in the home node at 409. In other words, A monitoring message proxy connect (monitor message) is sent from the identified home agent to a remote node which is the home of the address space at 409. Note that the node can belong to a different coherent domain and use the fabric, or it could be within the same coherent domain. In that case the proxy would be an on die interconnect.

A response from the proxy connect regarding the success or failure of the registration of the monitor is received by the originating core at 411. Examples of what may cause a failure include, but are not limited to, overlapping address spaces, no free monitor space, and hardware failure. If the monitor(s) is/are successful, then the tag directory for the core is updated. Further, in most embodiments, a monitoring table is updated across all proxies in the socket upon an acknowledgment of one or more monitors being configured. Note that the success or failure response from the proxies includes an identification of the proxy which is placed into the tag directory (using bit masking, Bloom filtering, etc.). In some embodiments, failure cancels registration to peers in the home node.

After registration, in some embodiments, a notification of a transaction to the monitored address space is received at 413. For example, a remote monitor processes a write to the monitored address. This may be received by the core or a proxy. The receipt of such a notification causes the tag directory to be updated to reflect the access. For example, shows information 309 is updated.

In case of success, where all the different operations are executed without a violation the requesting core sends a monitor release to the monitoring proxies at 413. For example, the core executes mreset to release the monitors and once the release instruction is executed the core notifies the release to the remote proxy (such as a fabric). The proxy propagates the release notification to the real home for this monitor and cores. The return of the mreset call will return to the software stack the sharer information of what nodes potentially have a copy for the monitored address range. The software stack is responsible to flush remote copies.

Figure 5:
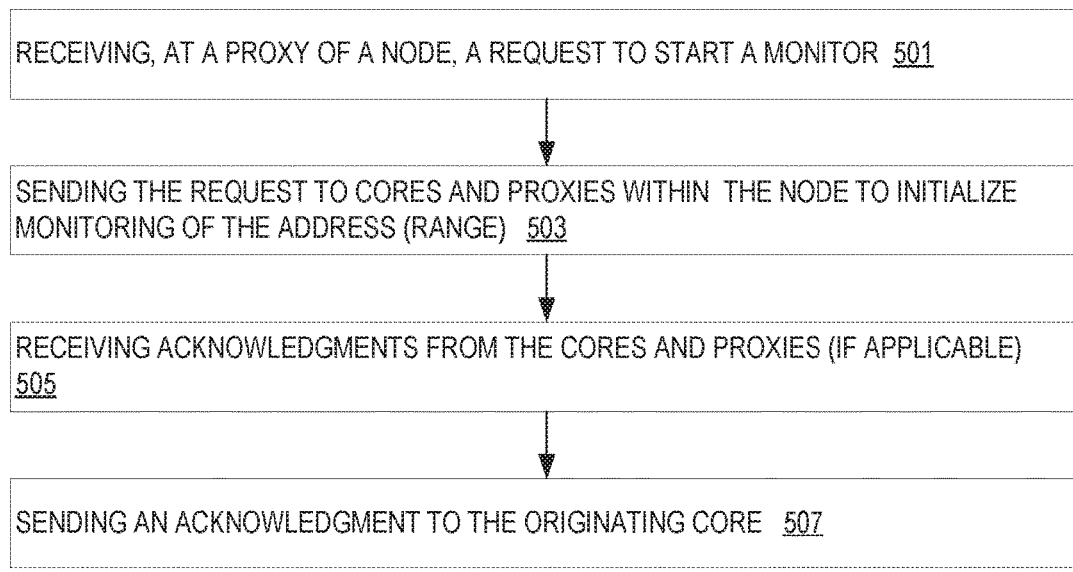
FIG. 5 illustrates an exemplary embodiment of the use of monitor on the receiving side.

FIG. 5 illustrates an exemplary embodiment of the use of monitor on the receiving side. At 501, a proxy of the receiving node receives a request to start a monitor. In other words, a monitoring message proxy connect (monitor message) is received at the remote node which is the home of the address space. Note that the node can belong to a different coherent domain and use the fabric, or it could be within the same coherent domain. In that case the proxy would be an on die interconnect.

This request is sent to cores and proxies at 503.

Acknowledgements from the cores and proxies regarding the request is received by the receiving proxy (e.g., fabric) at 505. For example, is the monitor successfully setup or not. These acknowledgments typically include an identifier of the responder.

These acknowledgments are processed by the proxy into a single acknowledgment which is sent to the originating core at 507. The acknowledgment to the originating core includes identifiers of where monitoring is taking place.

Figure 6:
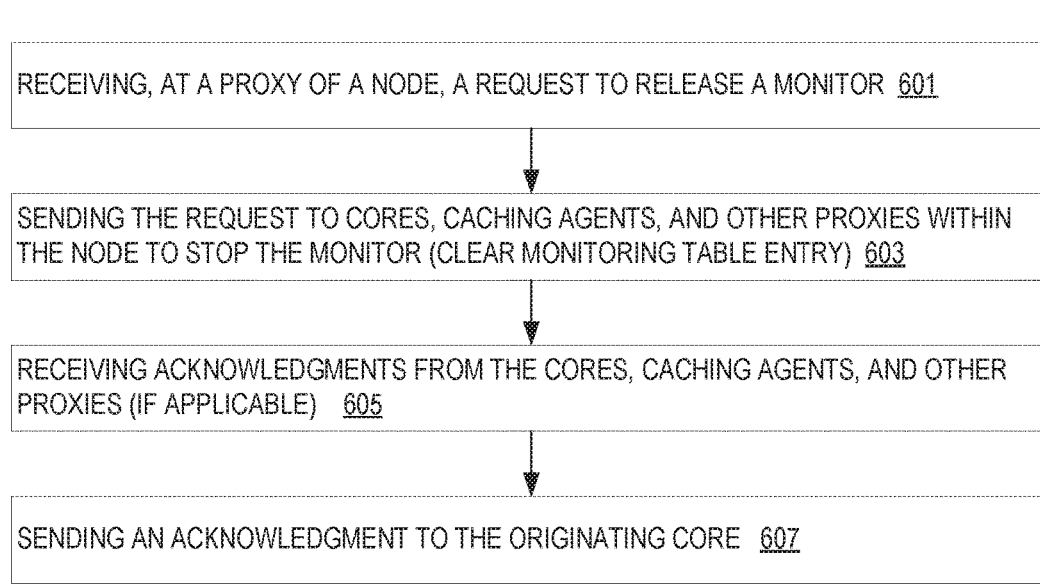
FIG. 6 illustrates an exemplary embodiment of the use of reset on the receiving side.

FIG. 6 illustrates an exemplary embodiment of the use of reset on the receiving side. At 601, a proxy of the receiving node receives a request to release a monitor. In other words, a monitoring message proxy connect (sreset message) is received at the remote node which is the home of the address space. Note that the node can belong to a different coherent domain and use the fabric, or it could be within the same coherent domain. In that case the proxy would be an on die interconnect.

This request is sent to cores and proxies at 603.

Acknowledgements from the cores and proxies regarding the request is received by the receiving proxy (e.g., fabric) at 605. These acknowledgments typically include an identifier of the responder.

These acknowledgments are processed by the proxy into a single acknowledgment which is sent to the originating core at 607. The acknowledgment to the originating core includes identifiers of where monitoring is taking place.

Figure 7:
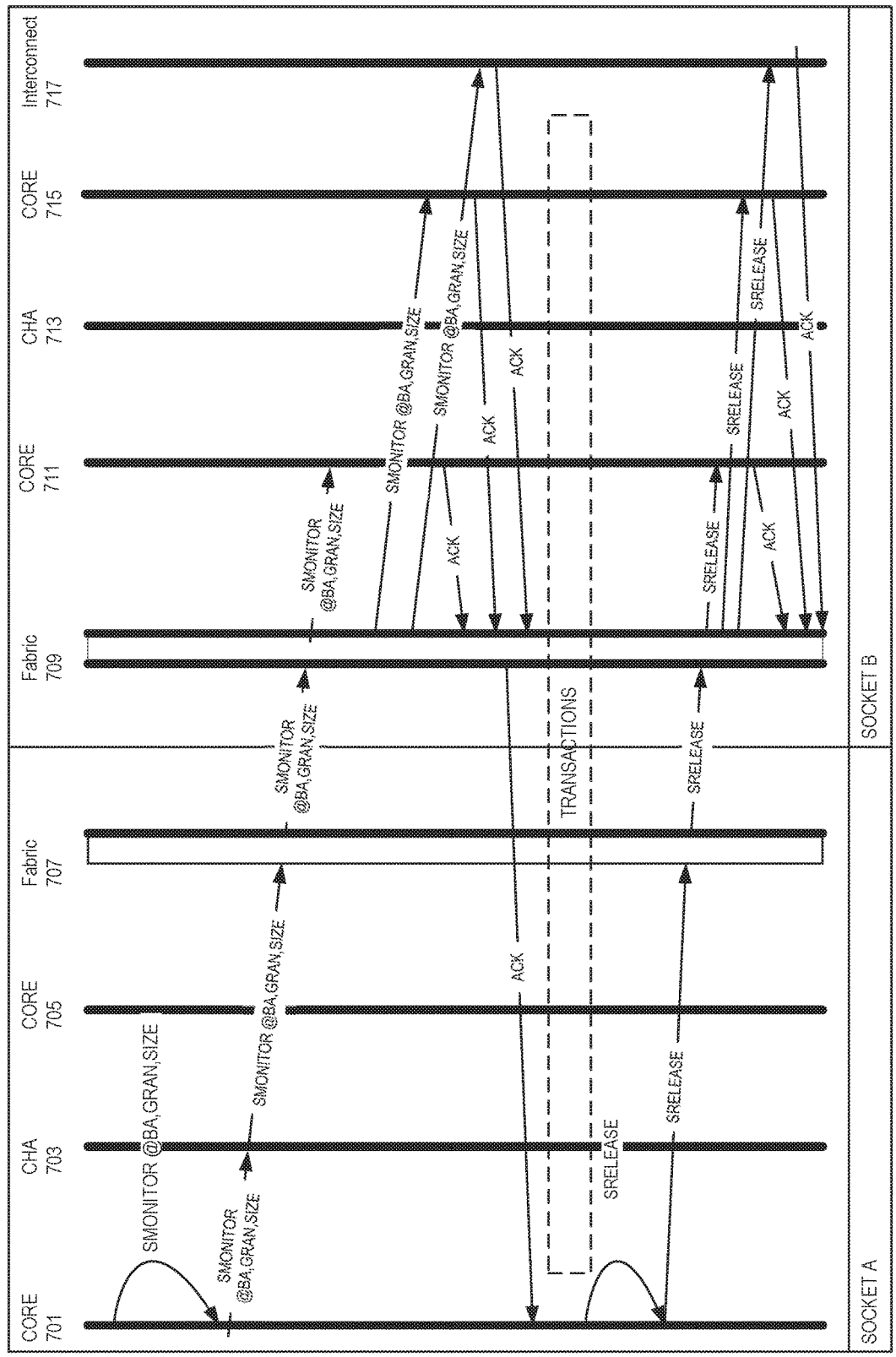
FIG. 7 illustrates an example of an initialization and finalization method according to an embodiment.

FIG. 7 illustrates an example of an initialization and finalization method according to an embodiment. An initiating core 701 executes a mcoherent. For example, a thread on core 701 uses an API to call mcoherent.

The core 701 in Node A sends a request to the local caching agent managing the baseline address (CHA: CA+HA) in order to setup a monitor. The core 701 notifies the CHA that it wants to monitor the address space (AS) where AS=[base_address to base_address+granularity*size].

The CHA 703 identifies to what home (such as a socket) the specified memory region is mapped. In some embodiments, if the region belongs to several homes the instruction is aborted. The CHA 703 identifies what is the home agent in the local coherent domain that is responsible to manage the request the address (base_address). The home agent (CHA 703) identifies what node (socket) in the system is the Home for the address space that the thread wants to monitor (it can be the local coherent domain).

The CHA 703 sends a monitoring message proxy connection fabric 707 to send to the remote node acting as a Home for AS. On the target side, the proxy generates a multicast message that targets including proxies to the socket such any on die interconnect agent in the node 717 and any fabric interconnect agent 709 in the node and all the cores 711 and 715 in the home socket.

All the target destinations respond success or failure about the registration of the monitor with acknowledgement messages. Typically, the responses will be collapsed by the proxy in the home node that received the monitoring request (in this example fabric 709). In case of failure it will propagate the notification to the requestor and will cancel the registration to the rest of peers inside the home node.

In case that any proxy agent or core identifies a transaction to the address space violating the requested monitoring AS, they will send a violation message to the core 701 notifying it of the violation. The core 701 propagates the violation to the user space.

When there are no issues, or there has been a violation detected, the core 701 will send a de-registration message alerting the proxies that the core does not need more monitoring on AS. The proxy 709 propagates the release notification to the real home for this monitor and cores. Note that the core 701 would know the proxy identifier because of the acknowledgement received in the registration process detailed earlier.

The figures below detail exemplary architectures and systems to implement embodiments of the above. In some embodiments, one or more hardware components and/or instructions described above are emulated as detailed below, or implemented as software modules.

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
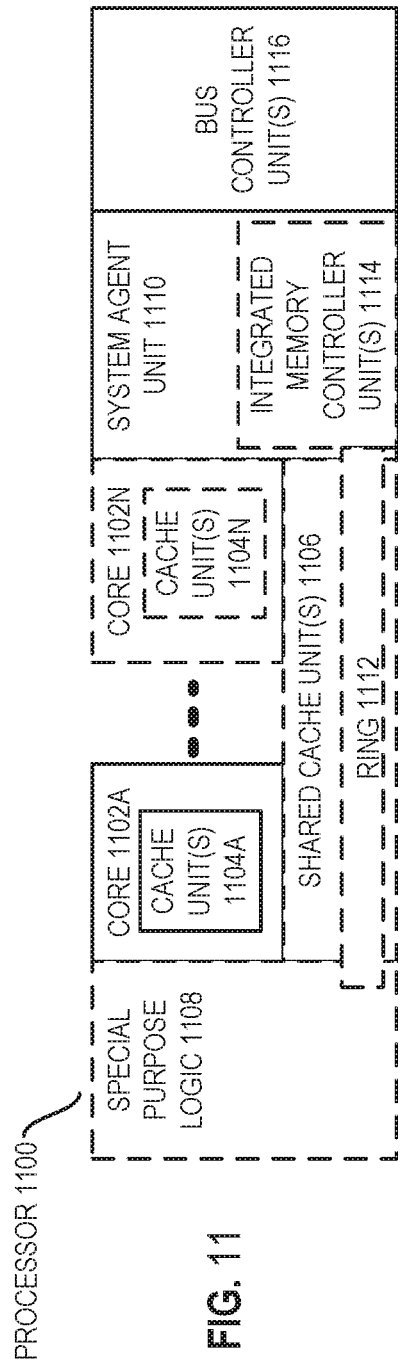
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
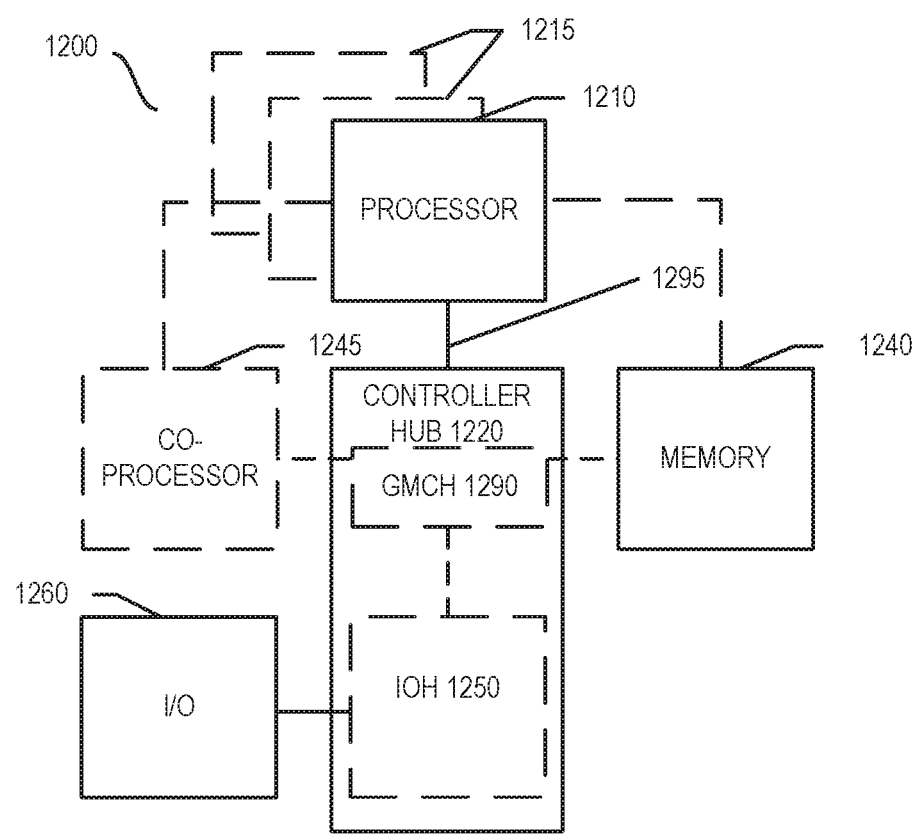
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
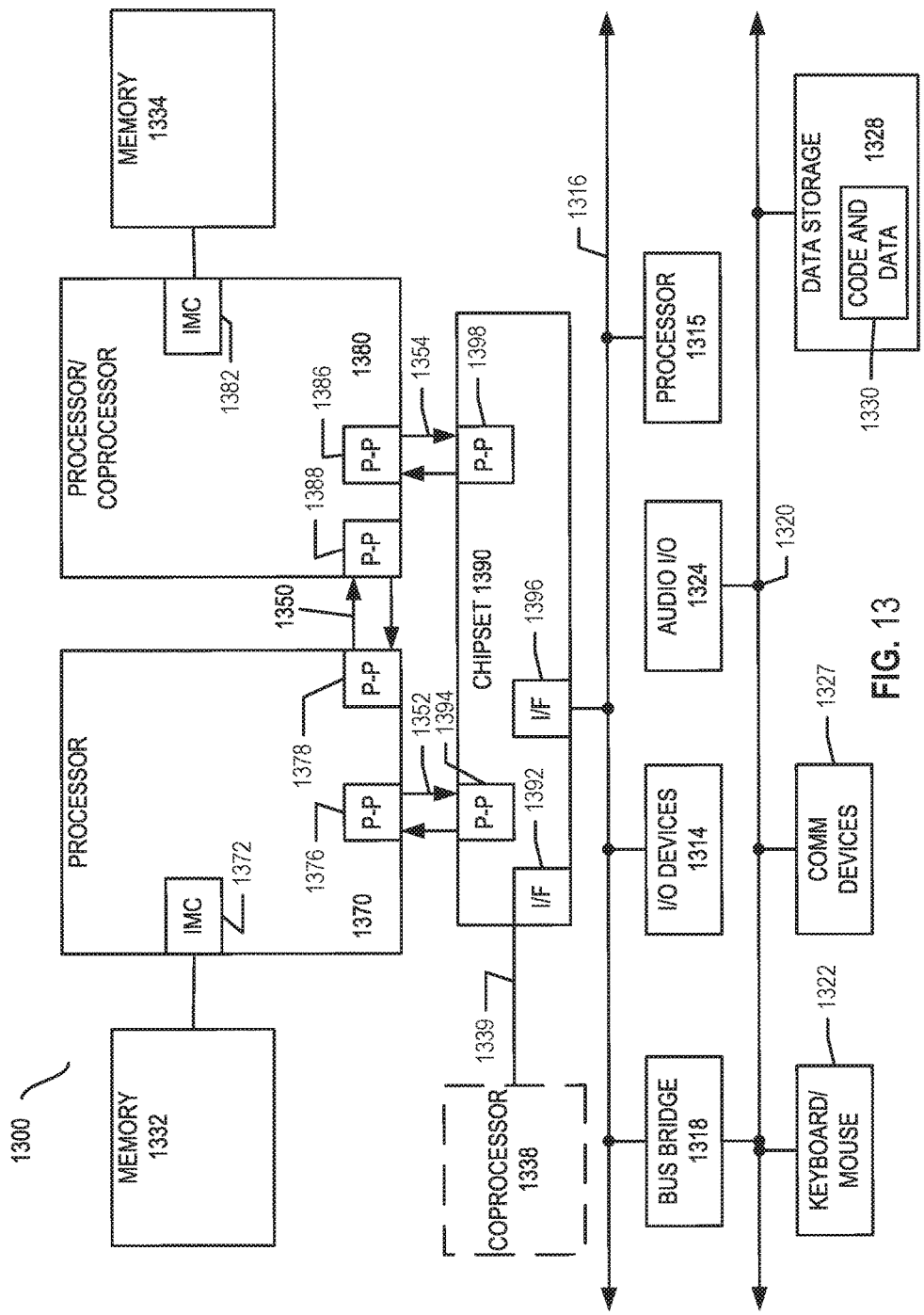

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
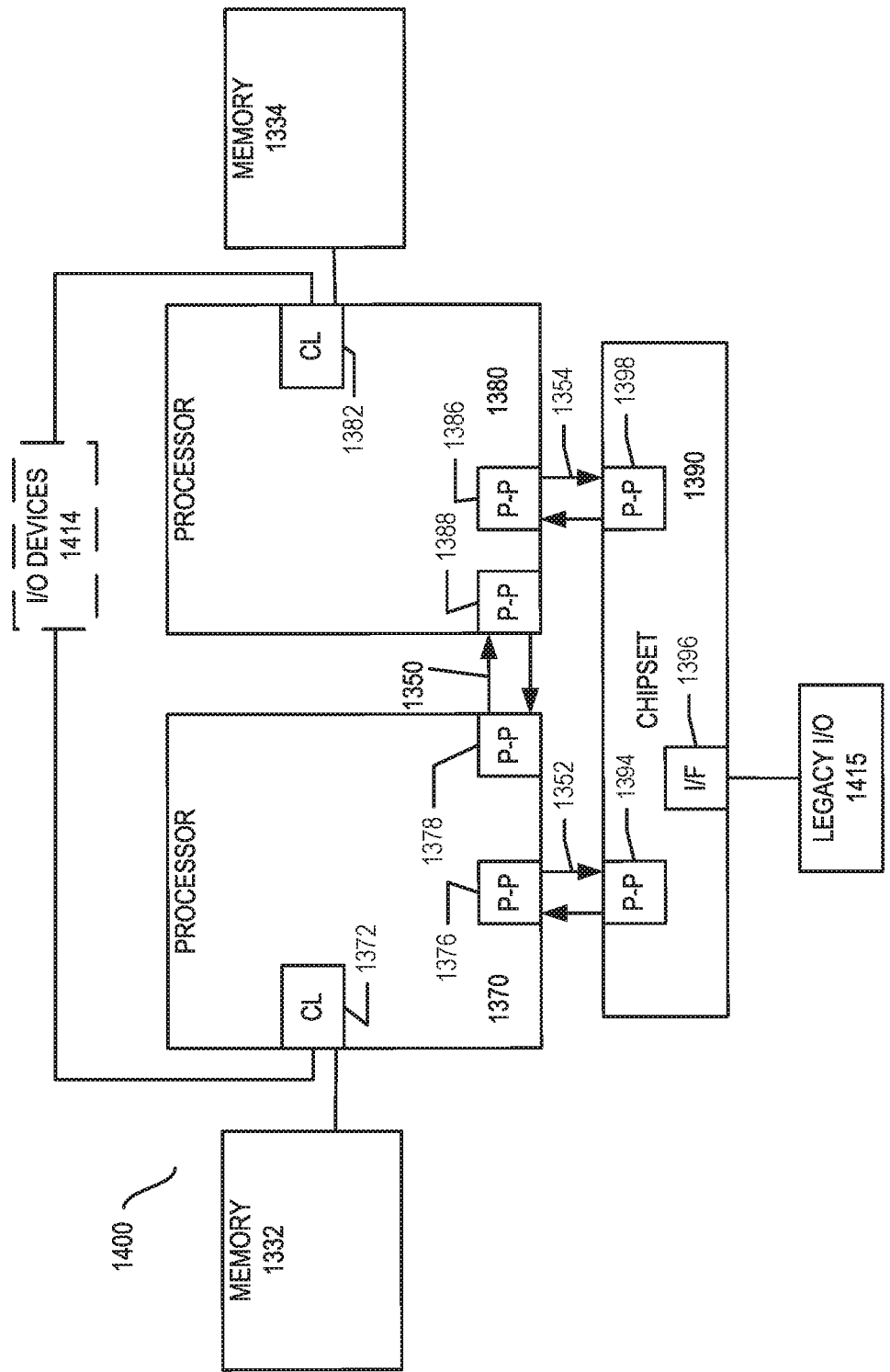

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
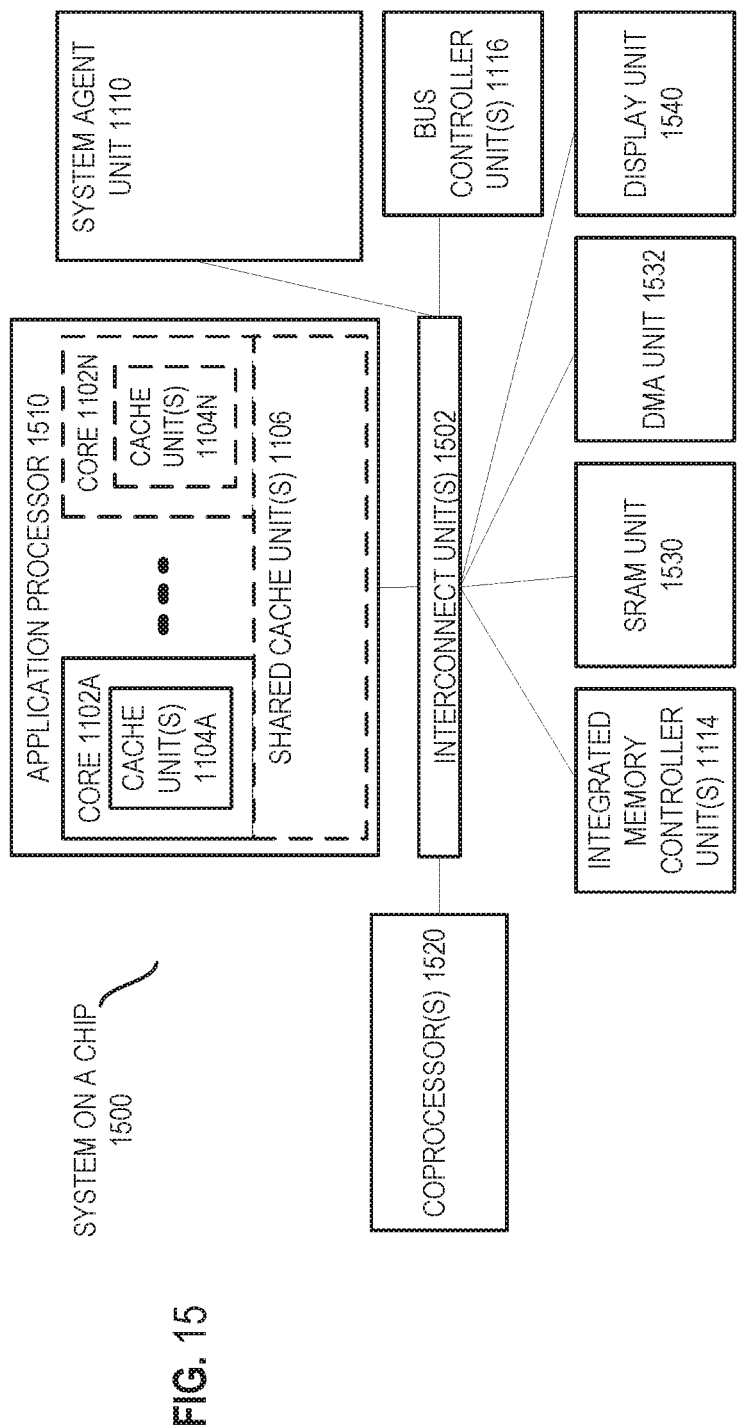

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

We claim:

1. An apparatus comprising:
at least one monitoring circuit to monitor for memory accesses to an address space;
at least one a monitoring table to store an identifier of the address space;
a tag directory per core used by the core to track entities that have access to the address space, wherein the tag directory is a look-up directory and wherein each row of the directory to include a memory size granularity, a hashed address, a tracking granularity, and a remote node indicator.

2. The apparatus of claim 1, wherein the memory size granularity is one of cache line, page, large page, or huge page.

3. The apparatus of claim 1, wherein the tracking granularity is by number of node groups.

4. The apparatus of claim 1, wherein the remote node indicator is a Bloom filter result of nodes that have access to the address space.

5. The apparatus of claim 1, wherein the remote node indicator is a bit mask of nodes that have access to the address space.

6. The apparatus of claim 1, further comprising:
a plurality of cores to execute instructions;
caching agent circuitry to process memory requests from at least one of the plurality of cores; and
home agent circuitry to process memory requests from the caching agent and as a home for part of a memory space of the apparatus.

7. The apparatus of claim 6, wherein the caching agent circuitry and home agent circuitry are a part of the same circuit.

8. The apparatus of claim 1, wherein the memory size granularity is one of cache line, page, large page, or huge page, the tracking granularity is by number of node groups.

9. The apparatus of claim 8, wherein the remote node indicator is a Bloom filter result of nodes that have access to the address space.

10. The apparatus of claim 8, wherein the remote node indicator is a bit mask of nodes that have access to the address space.

11. The apparatus of claim 1, further comprising:
caching agent circuitry to process memory requests from at least one of a plurality of cores; and
home agent circuitry to process memory requests from the caching agent and as a home for part of a memory space of the apparatus.

12. The apparatus of claim 11, wherein the caching agent circuitry and home agent circuitry are a part of the same circuit.

* * * * *